United States Patent
Hisada et al.

(10) Patent No.: US 8,681,297 B2
(45) Date of Patent: Mar. 25, 2014

(54) LIQUID CRYSTAL DISPLAY PANEL, AND LIQUID CRYSTAL DISPLAY DEVICE

(75) Inventors: Yuhko Hisada, Osaka (JP); Takaharu Yamada, Osaka (JP); Satoshi Horiuchi, Osaka (JP); Ryohki Itoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/578,368

(22) PCT Filed: Nov. 19, 2010

(86) PCT No.: PCT/JP2010/070732
§ 371 (c)(1),
(2), (4) Date: Aug. 10, 2012

(87) PCT Pub. No.: WO2011/104956
PCT Pub. Date: Sep. 1, 2011

(65) Prior Publication Data
US 2012/0314170 A1    Dec. 13, 2012

(30) Foreign Application Priority Data
Feb. 24, 2010    (JP) .................................. 2010-039292

(51) Int. Cl.
*G02F 1/1337* (2006.01)
*G02F 1/1343* (2006.01)
*G02F 1/1368* (2006.01)

(52) U.S. Cl.
USPC ............... 349/128; 349/38; 349/42; 349/110; 349/129; 349/143; 349/156

(58) Field of Classification Search
USPC ......... 349/38, 39, 42, 43, 110, 128, 129, 139, 349/143, 156, 178; 345/90, 91, 92
See application file for complete search history.

(56) References Cited

U.S. PATENT DOCUMENTS

| | | | |
|---|---|---|---|
| 6,671,009 B1 | 12/2003 | Hattori et al. | |
| 2003/0128315 A1 | 7/2003 | Tashiro et al. | |
| 2004/0227894 A1 | 11/2004 | Kim et al. | |
| 2005/0243231 A1 | 11/2005 | Horiguchi et al. | |
| 2007/0109452 A1 | 5/2007 | Kosugi et al. | |
| 2008/0158118 A1 | 7/2008 | Ono et al. | |
| 2009/0033836 A1 | 2/2009 | Kamada | |
| 2009/0290114 A1* | 11/2009 | Na et al. ..................... | 349/139 |
| 2011/0075082 A1 | 3/2011 | Katayama et al. | |
| 2011/0242073 A1 | 10/2011 | Horiuchi et al. | |
| 2011/0273653 A1* | 11/2011 | Yoshida et al. ............. | 349/138 |

FOREIGN PATENT DOCUMENTS

| | | |
|---|---|---|
| EP | 1 596 245 A1 | 11/2005 |
| EP | 1 975 691 A1 | 10/2008 |
| JP | 06-230419 A | 8/1994 |
| JP | 2005-338762 A | 12/2005 |

(Continued)

OTHER PUBLICATIONS

Official Communication issued in International Patent Application No. PCT/JP2010/070732, mailed on Dec. 21, 2010.

*Primary Examiner* — Dung Nguyen
*Assistant Examiner* — Tai Duong
(74) *Attorney, Agent, or Firm* — Keating & Bennett, LLP

(57) ABSTRACT

When viewed from the top of the liquid crystal display panel, a projecting section (4a) of a picture element electrode (4) is formed so as to at least partially match a contact hole (17). It is therefore possible to provide the liquid crystal display panel which achieves a high quality display and has a high aperture ratio and high transmittance.

11 Claims, 11 Drawing Sheets

(56) References Cited

FOREIGN PATENT DOCUMENTS

| JP | 2007-328369 A | 12/2007 |
|----|---------------|---------|
| JP | 2007-334372 A | 12/2007 |
| JP | 2008-96616 A | 4/2008 |
| JP | 2009-31674 A | 2/2009 |
| WO | 2010/001647 A1 | 1/2010 |
| WO | 2010/058635 A1 | 5/2010 |
| WO | 2010/092706 A1 | 8/2010 |

* cited by examiner

LIQUID CRYSTAL DISPLAY PANEL, AND LIQUID CRYSTAL DISPLAY DEVICE

TECHNICAL FIELD

The present invention relates to a liquid crystal display panel and a liquid crystal display device. In particular, the present invention relates to a liquid crystal display panel and a liquid crystal display device in which one (1) picture element is divided into a plurality of domains such that liquid crystal molecules can be oriented in multiple directions.

BACKGROUND ART

In recent years, liquid crystal display devices are rapidly becoming popular as alternatives to cathode-ray tubes (CRTs). Such liquid crystal display devices are used in a wide variety of devices, such as television devices, monitors, and mobile phones, because of their characteristics such as energy saving, reduced thickness, and lightweight.

In particular, there has been recently grown the so-called mobile device equipped with (i) a battery functioning as a power supply and having limited capacity and (ii) a liquid crystal display device functioning as display means.

In such a mobile device, the battery having limited capacity is employed as the power supply. Therefore, for a longer continuous operation time of the mobile device, greater importance is placed on reduction of power consumption of the liquid crystal display device.

Under the circumstances, attention has been given to a technique of realizing low power consumption of a liquid crystal display device by (i) increasing an aperture ratio and transmittance of a liquid crystal display panel provided in the liquid crystal display device and (ii) reducing a light amount of a backlight accordingly.

The liquid crystal display device most commonly used in the past is a TN (Twisted Nematic) mode liquid crystal display device which uses liquid crystal molecules having a positive dielectric anisotropy. However, such a TN mode liquid crystal display device has the problem that image quality such as a contrast and a color tone is significantly deteriorated when the liquid crystal display device is viewed at oblique angles from above, from underneath, from the left side, and from the right side, as compared with when viewed from the front.

That is, the TN mode liquid crystal display device has high dependence of image quality on viewing angles, and is therefore not suitable for an application in which the liquid crystal display device is expected to be viewed from a direction other than the front.

An IPS (In-Plane Switching) mode liquid crystal display device and an MVA (Multi-domain Vertical Alignment) mode liquid crystal display device are known as liquid crystal display devices in which such dependence of image quality on viewing angles is improved.

According to the IPS mode liquid crystal display device, dependence of image quality on viewing angles is remarkably improved because orientations of liquid crystal molecules in a plane parallel to a substrate surface are changed in accordance with an applied voltage. However, the IPS mode liquid crystal display device has a problem as follows: that is, two electrodes are provided on a side of a TFT substrate so as to control, for each picture element, liquid crystal molecules in the plane parallel to the substrate surface, and there exist regions above the two electrodes where the liquid crystal molecules cannot be controlled. This leads to a substantial decrease in aperture ratio.

On the other hand, according to the MVA mode liquid crystal display device, at least one of two substrates, between which a liquid crystal layer is interposed, has, on its side contacting the liquid crystal layer, (i) a transparent electrode with protrusions that function as orientation separation means and/or (ii) a transparent electrode with notches that function as orientation separation means. With such a transparent electrode(s), each picture element has regions where the liquid crystal molecules are oriented in respective different directions, and this achieves a wide viewing angle characteristic.

In recent years, however, definition of a liquid crystal display device is getting higher and a size of one (1) picture element tends to be reduced. In such a picture element, there is provided a transparent electrode which is patterned to have protrusions and notches that function as orientation separation means. Under the circumstances, an effective aperture ratio of one (1) picture element tends to be decreased.

In each of picture elements, disorders in orientations of liquid crystal molecules (hereinafter, sometimes referred to simply as "orientation disorder") are caused in step parts such as edge parts of the picture element, a region where a black matrix is provided, and contact hole sections. In particular, in a case where an effective aperture ratio of one (1) picture element is small as above described, a ratio of an area where orientation disorders occur to a total area of each picture element becomes higher.

As a result, differences in luminance between the picture elements occur due to uneven orientation disorder caused by variations of finished fine patterns (i.e., manufacturing variations). The differences in luminance are viewed as roughness of image, and this leads to a decrease in display quality of the liquid crystal display device.

Considered as a method for suppressing the decrease in display quality due to roughness of image is as follows. That is, (i) a transparent electrode can be employed which is patterned so as to further stabilize orientations of liquid crystal molecules in a region where an orientation disorder occurs; or (ii) a region where roughness of image occurs can be light-shielded.

For example, Patent Literature 1 discloses a vertical alignment type liquid crystal display device which includes picture element electrodes each having a shape formed by three polygonal transparent electrode parts which are connected in series.

FIG. 12 is a view illustrating a schematic configuration of a picture element electrode included in the vertical alignment type liquid crystal display device.

A picture element electrode 348 has a shape formed by three polygonal transparent electrode parts (hereinafter, referred to as "sub-picture-element electrodes 348$u$") connected with each other (see FIG. 12). Each picture element electrode 348 is provided in a corresponding sub-picture-element region 349 (see a hatched area in FIG. 12).

Note that each of the sub-picture-element electrodes 348$u$ has a polygonal shape whose outer edge or circumference is substantially equidistant from a center of the sub-picture-element electrode 348$u$ so that liquid crystal molecules are substantially radially oriented above the sub-picture-element electrode 348$u$.

The picture element electrodes 348 are provided, in a matrix manner, on an overlayer formed on an active matrix substrate (not illustrated). Each of the picture element electrodes 348 corresponds to any one of colors R (red), G (green), and B (blue), that is, each of the picture element electrodes 348 is provided so as to face any one of color filters 205R, 205G, and 205B (i) which are provided on a counter substrate facing the active matrix substrate and (ii) each of which has a substantially rectangular shape.

As is illustrated in FIG. 12, each of the picture element electrodes 348 has a wire which is a connection section 348c connected to a corresponding one of TFDs (Thin Film Diode) 320. The connection section 348c is made of a material, such as ITO (Indium Tin Oxide), which is identical with that of the picture element electrode 348.

The connection section 348c extends from a circumference of a sub-picture-element electrode 348u, located lowermost in the sub-picture-element region 349, to a contact hole 346. Picture element electrodes 348 belonging to the same column are connected to a single data line 314 in locations of corresponding contact holes 346 via corresponding TFDs 320.

Meanwhile, picture element electrodes 348 belonging to the same row face a single scanning line 214 (depicted by dotted lines in FIG. 12).

Specifically, the scanning lines 214 are provided on the counter substrate, and apertures 214a are formed in each of the scanning lines 214 in locations substantially corresponding to centers of respective sub-picture-element electrodes 348u. When a voltage is applied between the active matrix substrate and the counter substrate, an oblique electric field is caused, in each part where the aperture 214a matches the sub-picture-element electrode 348u, due to an interaction between the aperture 214a and the sub-picture-element electrode 348u. With the configuration, directions in which liquid crystal molecules are tilted are controlled.

As such, it is possible to control the liquid crystal molecules to be radially oriented, in accordance with a voltage to be applied between the active matrix substrate and the counter substrate. This makes it possible to form regions in each of which the liquid crystal molecules are radially oriented.

The overlayer has contact holes 346 each of which is an aperture having a substantially circular shape when viewed from a top of the liquid crystal display device. The connection section 348c of each of the picture element electrodes 348 is electrically connected to the TFD 320 and the data line 314 via the contact hole 346.

In the vertical alignment type liquid crystal display device having such an overlayer configuration, liquid crystal molecules are vertically oriented in an initial orientation state of liquid crystal to which no voltage is being applied. However, liquid crystal molecules located above contact holes are affected by inclined planes of the contact holes having step parts. Therefore, orientation disorders of liquid crystal are caused in the locations above the contact holes.

Under the circumstances, in a case where, for example, the contact holes 346 are provided in an effective display region of the picture element electrode 348, that is, in locations corresponding to the sub-picture-element electrodes 348u or in the vicinity of the locations, liquid crystal molecules in the effective display region are adversely affected by orientation disorders of liquid crystal molecules caused in locations corresponding to the contact holes 346, and accordingly an image quality problem, such as display unevenness, is caused.

According to the configuration disclosed in Patent Literature 1, in order to suppress occurrence of such an image quality problem, each of the contact holes 346 is provided in a location which is in a picture element region but does not match any of the picture element electrodes 348 in the sub-picture-element region 349 (see FIG. 12). Specifically, each of the contact holes 346 is provided in a location farthest from the picture element electrode 348 in the sub-picture-element region 349 (i.e., at a corner of the sub-picture-element region 349).

According to the configuration, it is possible to cause the contact hole 346 to be distant from the sub-picture-element electrode 348u (corresponding to the effective display region) as far as possible. Therefore, liquid crystal molecules in the effective display region, which corresponds to locations of the sub-picture-element electrodes 348u and serves as a display section, are hardly affected by the orientation disorders caused in the locations of the contact holes 346.

Patent Literature 1 describes that, with such a configuration, it is possible to realize a liquid crystal display device which can (i) suppress occurrence of an orientation disorder of liquid crystal molecules caused in the effective display region and (ii) display an image with high quality.

Patent Literature 1 further describes that, since the contact hole 346 is provided in the location which does not match the picture element electrode 348, it is possible to prevent a decrease in aperture ratio.

CITATION LIST

Patent Literature

[Patent Literature 1]
Japanese Patent Application Publication Tokukai No. 2005-338762 A (Publication date: Dec. 8, 2005)

SUMMARY OF INVENTION

Technical Problem

However, according to the configuration disclosed in Patent Literature 1, the contact hole 346 needs to be distant from the sub-picture-element electrodes 348u, which correspond to the effective display region (see FIG. 12). Therefore, it is difficult to secure a large area for the sub-picture-element electrodes 348u (i.e., the effective display region).

In general, a contact hole is formed so as to have a forward tapered shape, considering the subsequent processes. In such a case, the contact hole has a forward tapered part, that is, an inclined region.

The contact hole having such an inclined region can cause an orientation disorder of liquid crystal molecules. In a case where the region suffering from the orientation disorder is light-shielded so that the orientation disorder is not viewed, an aperture ratio and transmittance of the liquid crystal display panel and the liquid crystal display device are decreased.

Therefore, with such a configuration, it is difficult to provide a liquid crystal display panel and a liquid crystal display device which have a high aperture ratio and high transmittance.

The present invention is accomplished in view of the problem, and its object is to provide (i) a liquid crystal display panel capable of a high quality display and having a high aperture ratio and high transmittance and (ii) a liquid crystal display device capable of a high quality display with low power consumption.

Solution to Problem

In order to attain the object, a liquid crystal display panel of the present invention includes: a first insulating substrate; a second insulating substrate; a liquid crystal layer, interposed between the first insulating substrate and the second insulating substrate, exhibiting a negative dielectric anisotropy; a plurality of picture elements, the liquid crystal display panel being arranged such that: one substrate of the first and second insulating substrates has, on its side contacting the liquid crystal layer, a common electrode with protrusions and/or notches that function as orientation separation means; the other substrate has scanning signal lines, data signal lines, and picture element electrodes provided on a side thereof contacting the liquid crystal layer; each of the picture element electrodes has a notch section and a projecting section; the picture element electrodes are electrically connected to respective drain electrodes of active elements, which are provided to control the picture element electrodes, via corresponding through holes provided in an insulating layer; the picture element electrodes of the other substrate are located closer to the liquid crystal layer than the insulating layer; and at least part of the projecting section of the picture element electrode matches the through hole when viewed from a top of the liquid crystal display panel, so that the picture elements are identical to one another in orientation pattern of liquid crystal molecules oriented in different directions in the liquid crystal layer.

Such a through hole is generally formed so as to have a forward tapered shape, considering the subsequent processes. In this case, the through hole has a step part which has an inclined region.

The through hole having such an inclined region can cause an orientation disorder of liquid crystal molecules.

The conventional technique has employed (i) a configuration in which a region where a through hole is formed needs to be distant from a region (corresponding to an effective display region) where a picture element electrode is formed or (ii) a configuration in which a through hole is formed substantially in center of a picture element electrode corresponding to an effective display region. According to such conventional configurations, it is difficult to (i) secure a large effective display region and (ii) reduce influence of liquid crystal molecules suffering from orientation disorders due to the through hole on other liquid crystal molecules which are to be oriented in predetermined directions in the effective display region.

In the region where the through hole is formed, an orientation disorder of liquid crystal molecules occurs due to a shape of the inclined region of the through hole. Influence of such an orientation disorder is not negligible in display panels such as a high definition liquid crystal display panel in which a size of one (1) picture element is small. Specifically, a defective display such as roughness of image can be caused by uneven orientation disorder caused by (i) variations in finished fine patterns of through holes and/or (ii) a slight difference in shape of inclined region caused due to a manufacturing process.

Moreover, the region where the through hole is formed, that is, the region suffering from the orientation disorder, affects orientations of liquid crystal molecules around the region. Therefore, a defective display such as roughness of image is more likely to be viewed.

According to the configuration of the present invention, at least part of the projecting section of the picture element electrode matches the through hole when viewed from the top of the liquid crystal display panel.

According to the configuration, it is possible to reduce the influence of liquid crystal molecules suffering from orientation disorder due to the through hole on other liquid crystal molecules which are to be oriented in predetermined directions in the effective display region. Accordingly, it is possible to suppress a defective display such as roughness of image.

Therefore, it is possible to provide the liquid crystal display panel capable of a high quality display and having a high aperture ratio and high transmittance.

Note that the through hole encompasses not only a substantive connecting section of the drain electrode of the active element and the picture element electrode, but also a region (the inclined region) of an inclined part of the insulating layer.

In order to attain the object, a liquid crystal display device of the present invention includes the liquid crystal display panel of the present invention.

According to the configuration, the liquid crystal display device includes the liquid crystal display panel which can secure a high aperture ratio and high transmittance while effectively suppressing deterioration in display quality such as roughness of image. Therefore, it is possible to provide the excellent liquid crystal display device capable of a high quality display with low power consumption.

Advantageous Effects of Invention

As above described, the liquid crystal display panel of the present invention is arranged such that: one substrate of the first and second insulating substrates has, on its side contacting the liquid crystal layer, a common electrode with protrusions and/or notches that function as orientation separation means; the other substrate has scanning signal lines, data signal lines, and picture element electrodes provided on a side thereof contacting the liquid crystal layer; each of the picture element electrodes has a notch section and a projecting section; the picture element electrodes are electrically connected to respective drain electrodes of active elements, which are provided to control the picture element electrodes, via corresponding through holes provided in an insulating layer; the picture element electrodes of the other substrate are located closer to the liquid crystal layer than the insulating layer; and at least part of the projecting section of the picture element electrode matches the through hole when viewed from a top of the liquid crystal display panel, so that the picture elements are identical to one another in orientation pattern of liquid crystal molecules oriented in different directions in the liquid crystal layer.

As above described, the liquid crystal display device of the present invention includes the liquid crystal display panel of the present invention.

Therefore, it is possible to provide the liquid crystal display panel capable of a high quality display and having a high aperture ratio and high transmittance. Further, a liquid crystal display device equipped with such a liquid crystal display panel can reduce luminance of backlight, and can accordingly carry out a display with low power consumption.

DESCRIPTION OF EMBODIMENTS

The following description will discuss, in detail, embodiments of the present invention with reference to drawings. Note, however, that the descriptions of dimensions, materials, and shapes of constituent members, and their relative locations etc. in the embodiments merely exemplify an embodiment of the present invention, and therefore should not be interpreted as limiting the scope of the invention only to them.

Embodiment 1

The following description will discuss Embodiment 1 of the present invention, with reference to FIGS. 1 through 4.

Embodiment 1 described below employs a liquid crystal display device which includes an MVA (Multidomain Vertical Alignment) type liquid crystal display panel in which one (1) picture element region is divided into a plurality of domains (hereinafter, the liquid crystal display device is referred to as "MVA type liquid crystal display device").

Note that the "one (1) picture element region" indicates not only a region corresponding to a picture element electrode directly connected to a TFT element (active element) but also a region of a sub-picture-element electrode which is connected, via a coupling capacitor, to the TFT element or the picture element electrode connected to the TFT element. Alternatively, in a case where a picture element electrode and a sub-picture-element electrode, which are connected to a TFT element, are assumed to be an integrated member, the "one (1) picture element region" indicates a region where the integrated member is provided.

Figure 2:
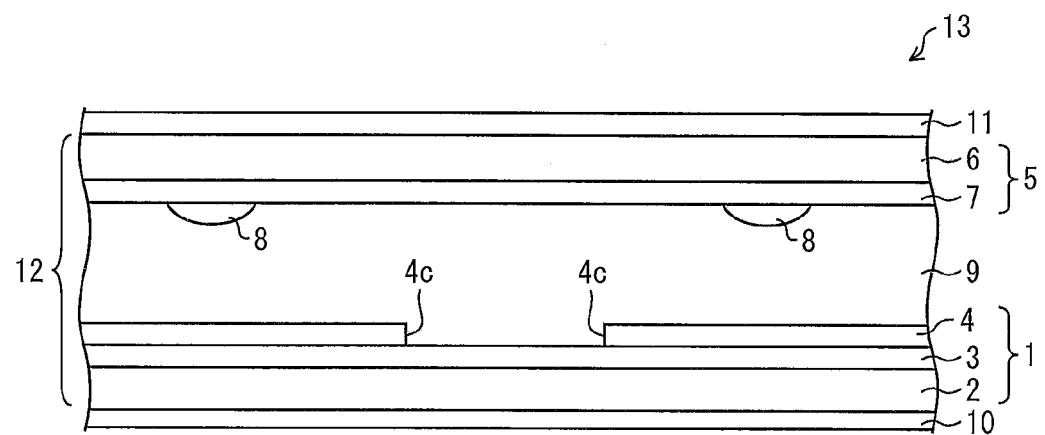
FIG. 2 illustrates a schematic configuration of a liquid crystal display device, in accordance with an embodiment of the present invention.

The following description will discuss, with reference to FIG. 2, a configuration of an MVA type liquid crystal display device 13 including an MVA type liquid crystal display panel 12 of the present invention.

FIG. 2 illustrates a schematic configuration of the liquid crystal display device 13, in accordance with an embodiment of the present invention.

The liquid crystal display panel 12 includes (i) an array substrate 1 serving as a first substrate (first insulating substrate), (ii) a counter substrate 5 serving as a second substrate (second insulating substrate), and (iii) a liquid crystal layer 9 which is interposed between the array substrate 1 and the counter substrate 5 and is made of a liquid crystal material having a negative dielectric anisotropy (see FIG. 2).

The array substrate 1 includes (i) a glass substrate 2 that functions as an insulating substrate, (ii) a TFT element formation layer (not illustrated) which is formed on the glass substrate 2 and contains a TFT element and a wire electrically connected to the TFT element, (iii) an interlayer insulating film 3 (insulating layer) formed on the TFT element formation layer, and (iv) a picture element electrode 4 which is electrically connected to a drain electrode of the TFT element via a contact hole (not illustrated) which is formed in the interlayer insulating film 3. Further, a vertical alignment film (not illustrated) is provided on a side of the picture element electrode 4 which side contacts the liquid crystal layer 9.

The picture element electrode 4 has a projecting section and a notch section. In FIG. 2, a part of the notch section 4c is indicated. Note that details of the projecting section and the notch section of the picture element electrode 4 will be described later.

On the other hand, the counter substrate 5 includes (i) a glass substrate 6 serving as an insulating substrate, (ii) a counter electrode 7 (common electrode) formed on the glass substrate 6, and (iii) a protrusion section 8 which is formed on the counter electrode 7 and serves as orientation separation means. Further, a vertical alignment film (not illustrated) is provided on a side of the counter electrode 7 and the protrusion section 8 which side contacts the liquid crystal layer 9.

A polarization plate 10 is provided on a side of the array substrate 1 which side is opposite to the side contacting the liquid crystal layer 9. A polarization plate 11 is provided on a side of the counter substrate 5 which side is opposite to the side contacting the liquid crystal layer 9.

In Embodiment 1, the protrusion section 8, which is a protruding structure serving as orientation separation means, is provided on the counter substrate 5. Note, however, that Embodiment 1 is not limited to this, and a cut part (notch section), which is formed by cutting the counter electrode 7, can be employed as the orientation separation means. A cross-sectional shape of the protrusion section 8 is not limited to the one illustrated in FIG. 2 but can be a cross-sectional shape such as a triangular shape or a trapezoidal shape.

In Embodiment 1, the protrusion section 8 is made of a photosensitive resist having high transmittance of light in a visible region and is formed so as to have a predetermined shape. Note, however, that Embodiment 1 is not limited to this.

In Embodiment 1, for example, a color filter layer (not illustrated) having any of colors red, green, and blue is provided between the glass substrate 6 and the counter electrode 7 for each of the picture element electrodes 4 which are provided for the respective picture elements of the array substrate 1. Note, however, that Embodiment 1 is not limited to this, and the color filter layers can be provided on a side of the array substrate 1 (this configuration is called COA (Color Filter On Array) configuration).

Figure 3:
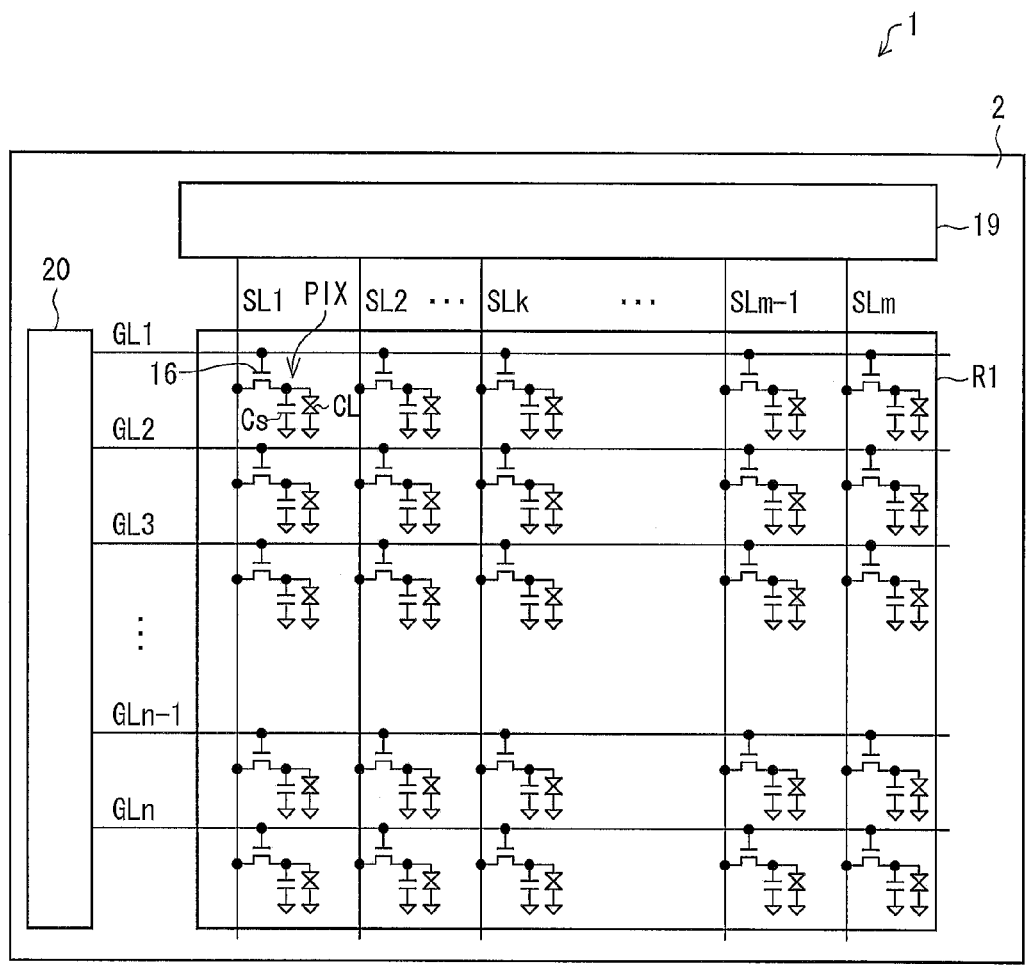
FIG. 3 illustrates a schematic configuration of an array substrate included in a liquid crystal display device, in accordance with an embodiment of the present invention.

The following description will discuss, in detail, a configuration of the array substrate 1 provided in the liquid crystal display device 13, with reference to FIG. 3.

FIG. 3 illustrates a schematic configuration of the array substrate 1 included in the liquid crystal display device 13, in accordance with an embodiment of the present invention.

The array substrate 1 has (i) a display region R1 in which picture elements PIX are arranged in a matrix manner, (ii) a data signal line driving circuit 19, and (iii) a scanning signal line driving circuit 20 (see FIG. 3). Note that the data signal line driving circuit 19 and the scanning signal line driving circuit 20 supply, to the display region R1, signals required for carrying out an image display.

In Embodiment 1, (i) the data signal line driving circuit 19 and the scanning signal line driving circuit 20 which are located in a peripheral area of the display region R1 and (ii) TFT elements 16 provided for the respective picture elements PIX in the display region R1 are monolithically formed, in order to reduce an area of an outer frame of the liquid crystal display device 13. Note, however, that Embodiment 1 is not limited to this. In a case of a large liquid crystal display device for which a reduction in outer frame area is not relatively important, the data signal line driving circuit 19 and the scanning signal line driving circuit 20 can be externally provided via a member such as a flexible printed wiring board.

In a case where a semiconductor layer (semiconductor layer 18 in FIG. 1) of the TFT element 16 is an amorphous semiconductor layer, it is preferable that the scanning signal line driving circuit 20 only and the TFT elements 16 are monolithically formed.

In the display region R1 of the array substrate 1, a plurality of data signal lines (SL1, SL2, and so forth) and a plurality of scanning signal lines (GL1, GL2, and so forth) are provided, and the TFT elements 16 are provided at respective intersections of the data signal lines and the scanning signal lines (see FIG. 3).

When scanning signals of High levels are sequentially supplied from the scanning signal line driving circuit 20 to the plurality of scanning signal lines (GL1, GL2, and so forth) and then the TFT elements 16 connected to the plurality of scanning signal lines are turned ON by the scanning signals, image signals, which have been supplied from the data signal line driving circuit 19 to source electrodes of the TFT elements 16 connected to the plurality of data signal lines (SL1, SL2, and so forth), are supplied to picture element electrodes connected to the drain electrodes of the respective TFT elements 16.

In FIG. 3, a liquid crystal capacitor CL indicates a capacitor constituted by (i) a picture element electrode connected to a drain electrode of a TFT element 16, (ii) a liquid crystal layer, and (iii) a counter electrode. Moreover, a storage capacitor Cs indicates a capacitor constituted by (i) a storage-capacitor counter electrode connected to the drain electrode of the TFT element 16, (ii) an interlayer insulating film, and (iii) a storage capacitor electrode connected to a storage capacitor line. Note that, in FIG. 3, a plurality of storage capacitor lines are not illustrated, which extend in parallel with the plurality of scanning signal lines (GL1, GL2, and so forth).

In Embodiment 1, the storage capacitor Cs is provided for each of the picture elements. Note, however, that Embodiment 1 is not limited to this, and the storage capacitor Cs can be omitted as appropriate.

Figure 1:
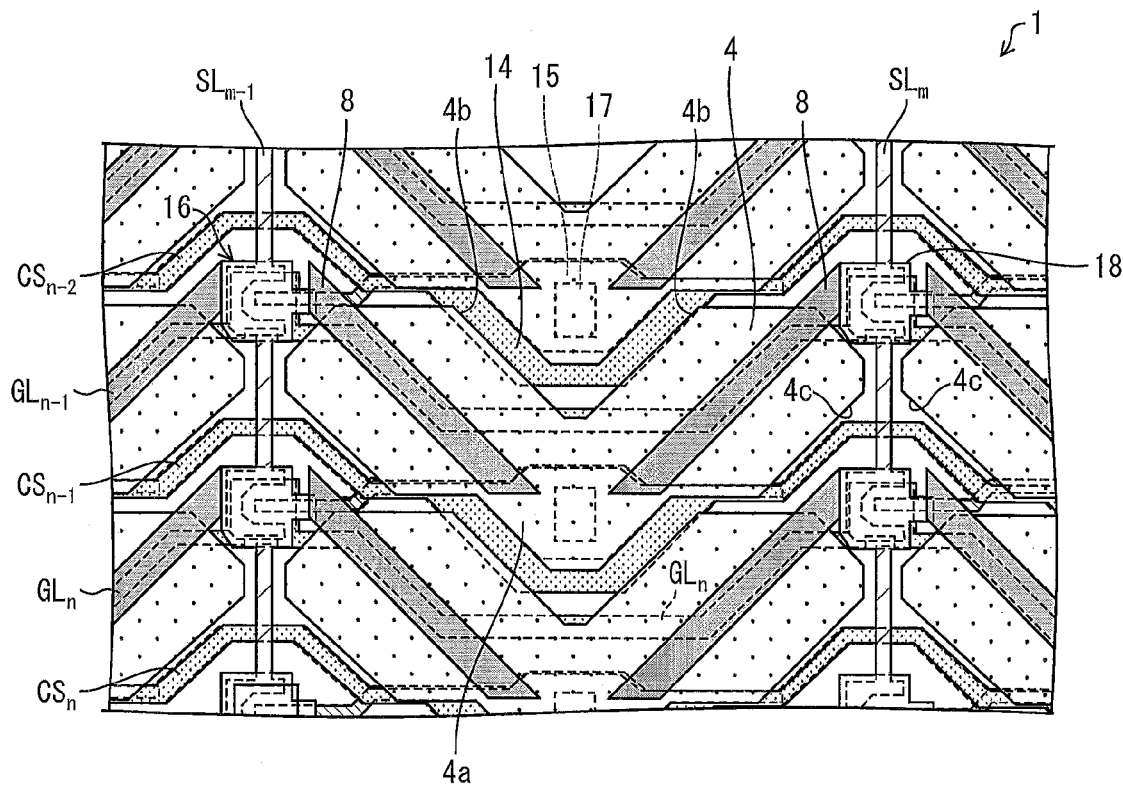
FIG. 1 illustrates a schematic shape of a picture element electrode provided on an array substrate of a liquid crystal display device, in accordance with an embodiment of the present invention.

The following description will discuss, in detail, the picture element electrode 4 provided in the array substrate 1, with reference to FIG. 1.

FIG. 1 illustrates a schematic shape of the picture element electrode 4 included in the array substrate 1 of the liquid crystal display device 13, in accordance with Embodiment 1.

In the liquid crystal display device 13 of Embodiment 1, one (1) pixel having a substantially square shape is made up of three picture elements, i.e., a red picture element, a green picture element, and a blue picture element. Each of the three picture elements has a substantially rectangular shape (see FIG. 1).

The picture element electrode 4, which is provided for each of the picture elements, has a projecting section 4a, a recessed section 4b, and notch sections 4c. The notch sections 4c are notches at two corners on an end of the picture element electrode 4, on which end a corresponding one of a plurality of storage capacitor lines (CSn-2, CSn-1, CSn, and so forth) is provided.

The projecting section 4a of the picture element electrode 4 is electrically connected to the drain electrode of the TFT element 16 via a contact hole 17 (through hole) formed in the interlayer insulating film. That is, the contact hole 17 is formed above a storage-capacitor counter electrode 15 (later described).

In general, a contact hole 17 is formed so as to have a forward tapered shape, considering the subsequent processes. In such a case, the contact hole 17) has a step part which has an inclined region.

The contact hole 17 illustrated in FIG. 1 encompasses not only a substantive connecting section of the drain electrode of the TFT element 16 and the picture element electrode 4, but also a region (the inclined region) of an inclined part of the interlayer insulating film.

Note that, in Embodiment 1, the contact hole 17 has a rectangular shape when viewed from a top of the liquid crystal display panel (see FIG. 1). However, Embodiment 1 is not limited to this, and the contact hole 17 can have a shape such as an elliptical shape or a circular shape.

In a region where the contact hole 17 is formed, an orientation disorder of liquid crystal molecules is caused due to a shape of the step part, and influence of such an orientation disorder is not negligible in display devices such as a high definition liquid crystal display device in which a size of one (1) picture element is small. Specifically, variations in finished fine patterns of contact holes 17 cause differences in orientation disorder of liquid crystal molecules, which results in a defective display such as roughness of image.

Moreover, the region where the contact hole 17 is formed, that is, the region suffering from the orientation disorder affects orientations of liquid crystal molecules around the region. Therefore, a defective display such as roughness of image is more likely to be viewed.

According to the array substrate 1 illustrated in FIG. 1, at least part of the projecting section 4a of the picture element electrode 4 matches the contact hole 17 when viewed from the top of the liquid crystal display panel.

According to the configuration, it is possible to reduce the influence of liquid crystal molecules suffering from orientation disorder due to the contact hole 17 on other liquid crystal molecules which are to be oriented in predetermined directions in the effective display region. Accordingly, it is possible to suppress a defective display such as roughness of image.

Note that the picture element electrode 4 can be made of an electrically conductive material such as ITO (Indium Tin Oxide) or IZO (Indium Zinc Oxide). Note that the picture element electrodes 4 can be patterned by (i) forming a resist film, having a predetermined pattern, on an ITO film or an IZO film and then (ii) etching the ITO film or the IZO film while using the resist film as a mask.

As above described, in the liquid crystal display device 13, at least part of the projecting section 4a of the picture element electrode 4 matches the contact hole 17, having the inclined region, when viewed from the top of the liquid crystal display panel.

With the configuration, it is possible to reduce the influence of liquid crystal molecules suffering from orientation disorder due to the contact hole 17 having the inclined region, on other liquid crystal molecules which are to be oriented in predetermined directions in the effective display region. Accordingly, it is possible to further suppress a defective display such as roughness of image.

The picture element electrode 4 of the liquid crystal display device 13 has the recessed section 4b formed by cutting out the picture element electrode 4 in a substantially triangular shape such that oblique parts of the recessed section 4b are substantially in line with inclinations (formed directions) of the protrusion sections 8, which are provided on a side of the counter substrate 5 and function as orientation separation means (see FIG. 1).

Note that the recessed section 4b of the picture element electrode 4 is shaped so that a projecting section 4a of a picture element 4 immediately adjacent to the recessed section 4b can be disposed (i.e., partially accommodated) in the recessed section 4b.

As above described, the recessed section 4b of the picture element electrode 4 functions as orientation separation means, and allows a projecting section 4a of a picture element 4 immediately adjacent to the recessed section 4b to be disposed therein.

According to the configuration, it is possible to efficiently utilize the recessed section 4b of the picture element electrode 4, which could not be used as an effective display region, and therefore an effective aperture area ratio can be increased. This makes it possible to provide the liquid crystal display device 13 having a high aperture ratio and high transmittance.

Note that a concrete example, in which an effective aperture area ratio is increased as compared with a conventional configuration, will be described later.

In Embodiment 1, each of the projecting section 4a and the recessed section 4b of the picture element electrode 4 has a substantially triangular shape. Note, however, that the shape of each of the projecting section 4a and the recessed section 4b is not limited to this, as long as the shape allows the projecting section 4a to be disposed in the recessed section 4b.

In Embodiment 1, when viewed from the top of the liquid crystal display panel, at least part of the recessed section 4b of the picture element electrode 4 is shaped substantially in parallel with the protrusion sections 8, which are provided on the side of the counter substrate 5 and function as orientation separation means. Note, however, that Embodiment 1 is not limited to this, and the recessed section 4b can be formed in any shape, provided that the projecting section 4a can be disposed in the recessed section 4b.

In Embodiment 1, the contact hole 17, which is formed so as to match the projecting section 4a when viewed from the top of the liquid crystal display panel, also matches a storage capacitor Cs formation section (later described) when viewed from the top of the liquid crystal display panel (see FIG. 1).

The storage capacitor Cs formation section is made up of a storage capacitor electrode 14, an insulating layer (not illustrated), and a storage-capacitor counter electrode 15. The storage capacitor electrode 14 (i) is formed in a layer where scanning signal lines (GLn-1, GLn, and so forth) are formed, (ii) is connected to a corresponding one of storage capacitor lines (CSn-2, CSn-1, CSn, and so forth), and (iii) reaches a recessed section 4b of an adjacent picture element electrode 4. The storage-capacitor counter electrode 15 (i) is formed in a layer where data signal lines (SLm-1, SLm, and so forth) are formed, (ii) is connected to a drain electrode of the TFT element 16, and (iii) faces the storage capacitor electrode 14 via the insulating layer.

According to the configuration, the contact hole 17 which causes an orientation disorder of liquid crystal molecules is formed such that, when viewed from the top of the liquid crystal display panel, at least part of the contact hole 17 matches the storage capacitor Cs formation section, which has a metal layer and does not allow light to pass through. This makes it possible to provide the liquid crystal display device 13 which has a high aperture ratio and high transmittance.

Note that each of the scanning signal lines (GLn-1, GLn, and so forth), the storage capacitor lines (CSn-2, CSn-1, CSn, and so forth), the data signal lines (SLm-1, SLm, and so forth), the storage capacitor electrode 14, and the storage-capacitor counter electrode 15 can be formed by the use of (i) an element selected from the group including Mo, Ta, W, Ti, Al, Cu, Cr, and Nd or (ii) an alloy material or a compound material mainly containing any of the elements. Note, however, that Embodiment 1 is not limited to this.

The picture element electrode 4 has the notch sections 4c which are notches at two corners on the end of the picture element electrode 4, on which end a corresponding one of the storage capacitor lines (CSn-2, CSn-1, CSn, and so forth) is provided (see FIG. 1). Each of the notch sections 4c is formed substantially in line with the inclination (formed direction) of the protrusion section 8, which is provided on the side of the counter substrate 5 and functions as orientation separation means.

Therefore, the notch sections 4c function as orientation separation means.

When viewed from the top of the liquid crystal display panel, the scanning signal lines (GLn-1, GLn, and so forth), which are provided on the array substrate 1, partially match the protrusion sections 8, which are provided on the side of the counter substrate 5 and function as orientation separation means (see FIG. 1).

When viewed from the top of the liquid crystal display panel, the picture element electrode 4 (i) does not match a first scanning signal line (which is one of the scanning signal lines GLn-1, GLn, and so forth) via which a scanning signal is supplied to the TFT element 16 to which the picture element electrode 4 is electrically connected, but (ii) matches a second scanning signal line (which is another one of the scanning signal lines GLn-1, GLn, and so forth) which is adjacent to the first scanning signal line.

As above described, in Embodiment 1, when viewed from the top of the liquid crystal display panel, the notch sections 4c of the picture element electrode 4 are formed substantially in parallel with the protrusion sections 8, which are provided on the side of the counter substrate 5 and function as orientation separation means. Note, however, that Embodiment 1 is not limited to this.

Figure 4:
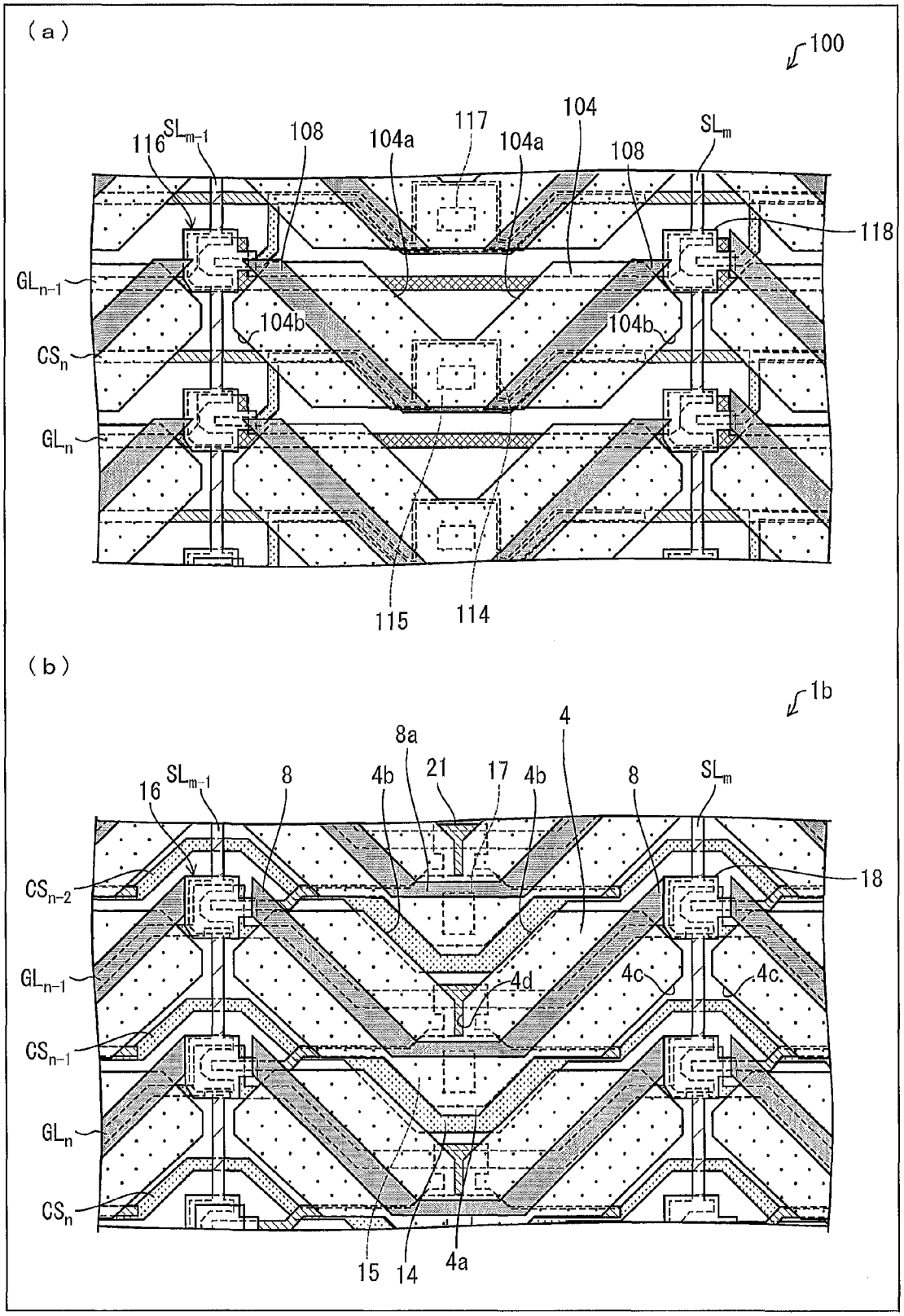
FIG. 4 is an explanatory view for explaining a difference in effective aperture area ratio between (i) a conventional array substrate in which a picture element electrode does not have a recessed section in which a projecting section is disposed and (ii) an array substrate in which a picture element electrode has a projecting section and a recessed section in which the projecting section can be disposed.

The following description will discuss, with reference to FIG. 4, a concrete example in which an effective aperture area ratio is increased as compared with a conventional configuration.

FIG. 4 is an explanatory view of a difference in effective aperture area ratio between (i) a conventional array substrate in which a picture element electrode does not have a recessed section in which a projecting section is disposed and (ii) an array substrate in which a picture element electrode has a projecting section and a recessed section in which the projecting section can be disposed.

(a) of FIG. 4 illustrates a schematic shape of a picture element electrode 104 provided in a conventional array substrate 100. (b) of FIG. 4 illustrates a schematic shape of a picture element electrode 4 provided in an array substrate 1b of a liquid crystal display device, in accordance with another embodiment of the present invention whose details will be described in Embodiment 4.

The picture element electrode 104 provided in the conventional array substrate 100 does not have a recessed section in which a projecting section is disposed (see (a) of FIG. 4).

Therefore, around a region where a contact hole 117 is formed, an orientation disorder of liquid crystal molecules is easily caused, and accordingly unevenness variations of finished fine patterns caused in a manufacturing process are easily viewed as roughness of image.

In a case where each picture element of the conventional array substrate 100 measures a 63.5 μm in longitudinal length and 190.5 μm in transverse length, an effective aperture area ratio is 31.6%, which is a ratio of (i) an area, of the picture element, other than (a) a region where a non-light-transmitting section, such as a metal member, is formed and (b) a region where orientation separation means is formed to (ii) an entire area of the picture element. On the other hand, in the array substrate 1b of (b) of FIG. 4, which has picture elements each having a size identical with that of the picture element of (a) of FIG. 4, the effective aperture area ratio is 34.9%. This is because the picture element electrode 4 has the projecting section 4a and the recessed section 4b in which the projecting section 4a can be disposed.

That is, in a case where the shape of the picture element electrode 4 included in the array substrate 1b of (b) of FIG. 4 is employed, the effective aperture area ratio is increased by 3.3% in each picture element, that is, increased by substantially 10% in one (1) pixel, as compared with the conventional configuration illustrated in (a) of FIG. 4.

Note that the picture element electrode 104 illustrated in (a) of FIG. 4 has notch sections 104a and 104b, a protrusion section 108, a storage capacitor electrode 114, a storage-capacitor counter electrode 115, a TFT element 116, and a semiconductor layer 118, which have respective functions similar to those of corresponding members illustrated in FIG. 1. Therefore, descriptions of these members are omitted here.

Embodiment 2

Figure 5:
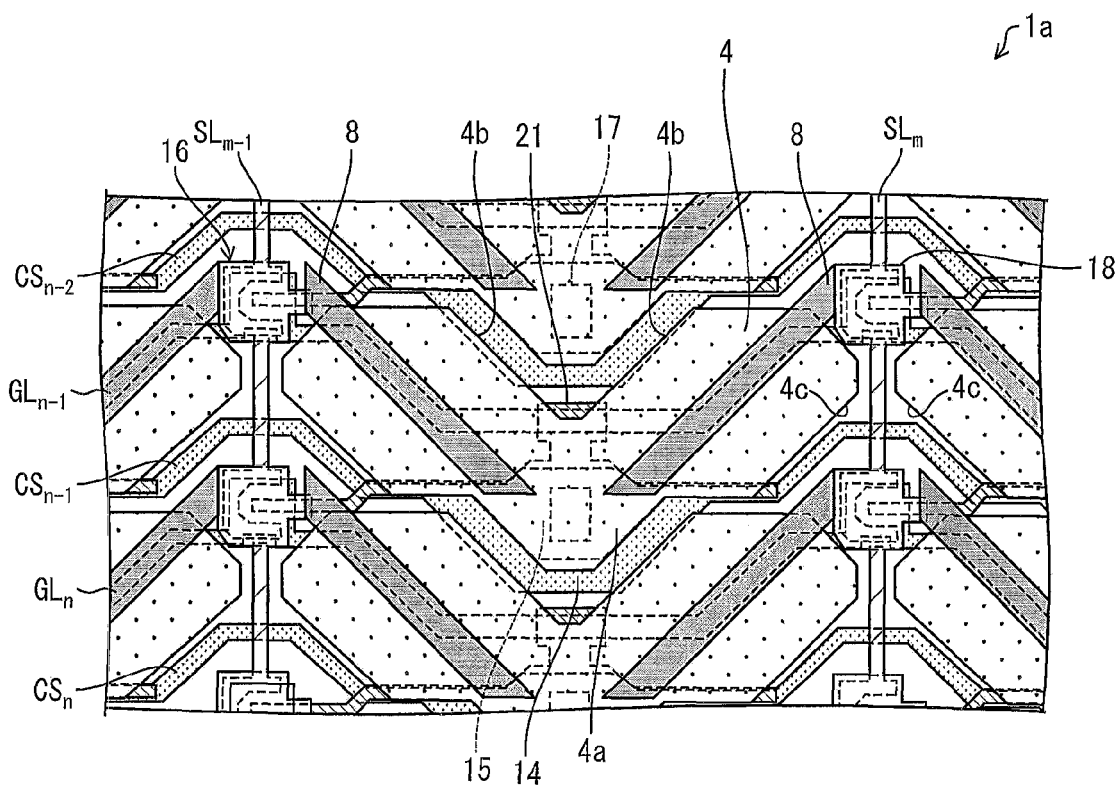
FIG. 5 illustrates a schematic shape of a picture element electrode provided in an array substrate of a liquid crystal display device, in accordance with another embodiment of the present invention.

The following description will discuss Embodiment 2 of the present invention, with reference to FIG. 5. Embodiment 2 is different from Embodiment 1 in that a shield electrode 21 is provided above a corresponding one of scanning signal lines (GLn-1, GLn, and so forth) for shielding an electric field of the scanning signal lines. The other configurations of Embodiment 2 are identical with those of Embodiment 1. For convenience of explanation, the same reference numerals are given to constituent members having functions same as those illustrated in the drawings of Embodiment 1, and descriptions of such constituent members are omitted here.

FIG. 5 illustrates a schematic shape of a picture element electrode 4 provided in an array substrate 1a of a liquid crystal display device, in accordance with Embodiment 2.

In FIG. 5, a projecting section 4a of the picture element electrode 4 is provided so as to be adjacent to a recessed section 4b of an adjacent picture element electrode 4, as with the configuration illustrated in FIG. 1.

In a high definition liquid crystal display device employing such an arrangement, a location in which the recessed section 4b, serving as orientation separation means, is to be provided is limited. Under the circumstances, the recessed section 4b can be formed above a corresponding one of the scanning signal lines (GLn-1, GLn, and so forth), and the scanning signal lines can be partially exposed (see FIG. 5).

In such a configuration, it is preferable to provide a shield electrode 21 in the vicinity of a corresponding one of the scanning signal lines (GLn-1, GLn, and so forth).

It is preferable that the shield electrode 21 is provided (i) in a layer where data signal lines (SLm-1, SLm, and so forth) are formed or (ii) by an adjacent picture element electrode 4.

According to a configuration in which no shield electrode 21 is provided in the vicinity of each of the scanning signal lines (GLn-1, GLn, and so forth) and the scanning signal lines are partially exposed, impurity ions are trapped in the exposed parts during a voltage hold period (in which a Low level electric potential is applied to the scanning signal lines), and the parts in which the impurity ions are trapped become singularities. Such singularities cause defective orientations of liquid crystal, and therefore a defective display is caused in the liquid crystal display device.

As above described, in a case where the shield electrode 21 is provided, it is possible to shield an electric field of the scanning signal lines (GLn-1, GLn, and so forth). This makes it possible to suppress the defective display of the liquid crystal display device.

Embodiment 3

Figure 6:
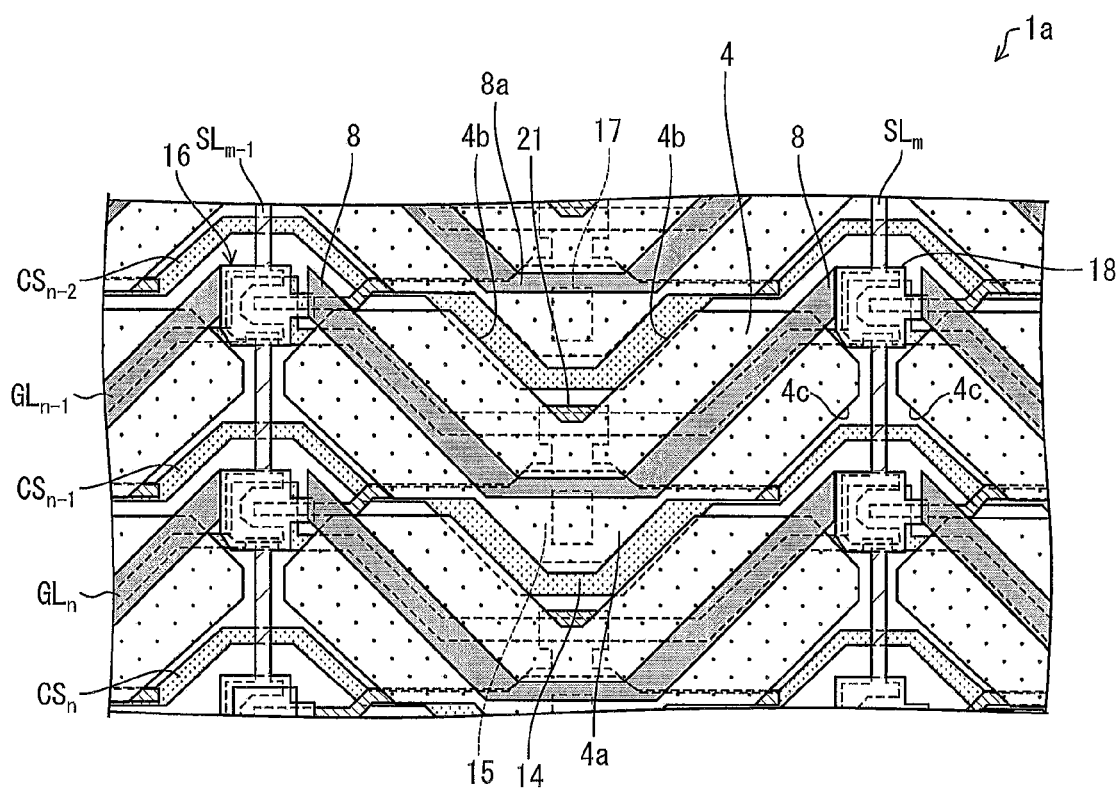
FIG. 6 illustrates (i) a schematic shape of a picture element electrode provided in an array substrate of a liquid crystal display device, in accordance with another embodiment of the present invention and (ii) a pattern of protrusion sections provided, as orientation separation means, on a counter electrode of a counter substrate.

The following description will discuss Embodiment 3 of the present invention, with reference to FIG. 6. Embodiment 3 is different from Embodiment 2 in that a protrusion section 8a (second protrusion) serving as orientation separation means is provided, in addition to a protrusion section 8, on a counter electrode 7 of a counter substrate 5 such that, when viewed from the top of the liquid crystal display panel, the protrusion section 8a matches an upper region of a contact hole 17 (i.e., an end part of the contact hole 17) provided in an array substrate 1a. The other configurations of Embodiment 3 are identical with those of Embodiments 1 and 2. For convenience of explanation, the same reference numerals are given to constituent members having functions same as those illustrated in the drawings of Embodiments 1 and 2, and descriptions of such constituent members are omitted here.

FIG. 6 illustrates (i) a schematic shape of a picture element electrode 4 provided in an array substrate 1a of a liquid crystal display device, in accordance with Embodiment 3 and (ii) a pattern of protrusion sections 8 and 8a provided, as orientation separation means, on a counter electrode 7 of a counter substrate 5.

When viewed from the top of the liquid crystal display panel, the upper region of the contact hole 17 provided in the array substrate 1a, i.e., a part of the contact hole 17, which part is close to a shield electrode 21, matches the protrusion section 8a which is provided on the counter electrode 7 of the counter substrate 5 and functions as orientation separation means (see FIG. 6).

With the above configuration in which the protrusion section 8a serving as the orientation separation means is disposed so as to match the upper region of the contact hole 17, i.e., the part of the contact hole 17 which part is close to the shield electrode 21, it is possible to control liquid crystal molecules to be consecutively oriented along the protrusion sections 8 and 8a which are provided, as orientation separation means, on the counter substrate 5.

It is therefore possible to suppress an orientation disorder of liquid crystal molecules around the contact hole 17, and it is possible to suppress uneven orientation disorder caused by manufacturing variations of the array substrate 1a and the counter substrate 5. According to the configuration, it is therefore possible to provide the liquid crystal display device which can effectively suppress a deterioration in display quality such as roughness of image. Note that sufficient effects can be brought about even if the protrusion section 8a is provided, as auxiliary orientation separation means, on the counter electrode 7 of the counter substrate 5.

In Embodiment 3, each of the protrusion section 8 and the protrusion section 8a is made of a photosensitive resist having high transmittance of light in a visible region and is formed so as to have a predetermined shape. Note, however, that Embodiment 3 is not limited to this.

In Embodiment 3, the protrusion section 8a is provided on the side of the counter substrate 5. Note, however, that Embodiment 3 is not limited to this and the protrusion section 8a can be provided on the side of the array substrate 1a.

Embodiment 4

Figure 7:
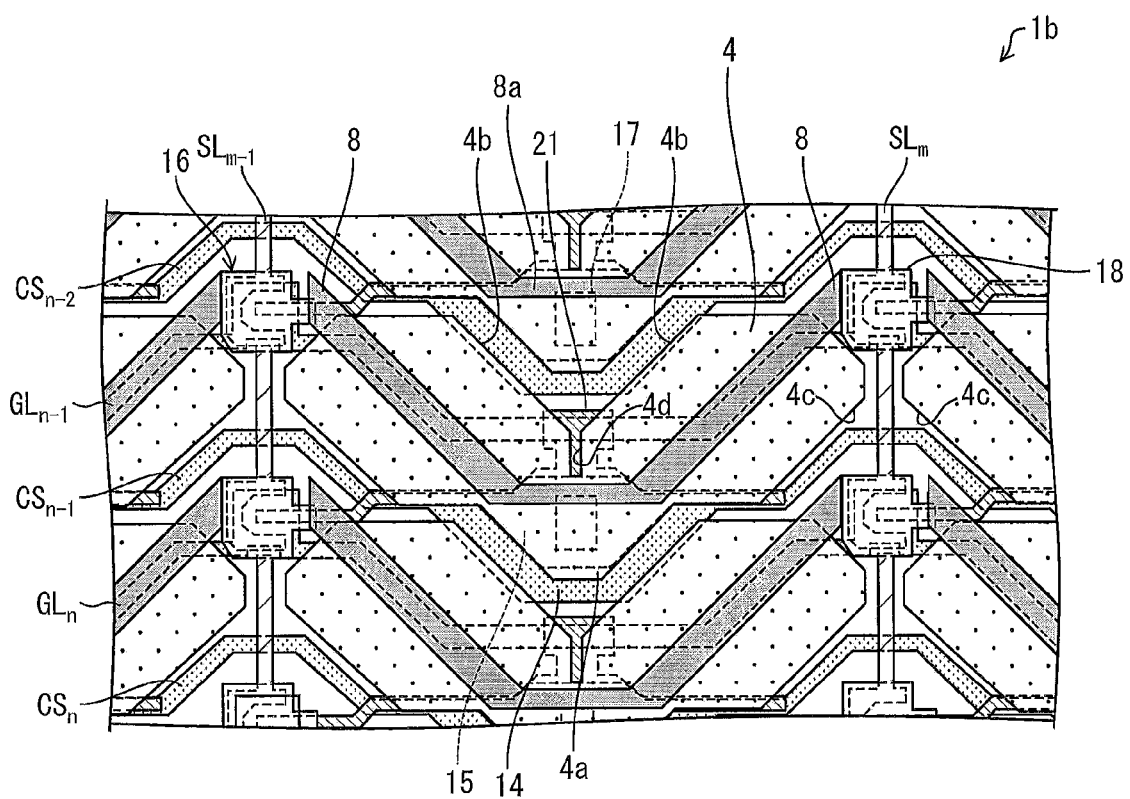
FIG. 7 illustrates (i) a schematic shape of a picture element electrode provided in an array substrate of a liquid crystal display device, in accordance with yet another embodiment of the present invention and (ii) a pattern of protrusion sections provided, as orientation separation means, on a counter electrode of a counter substrate.

The following description will discuss Embodiment 4 of the present invention, with reference to FIG. 7. Embodiment 4 is different from Embodiment 3 in that auxiliary orientation separation means 4d (second notch section) is provided at an apex of a V-shaped recessed section 4b of a picture element electrode 4. The other configurations of Embodiment 4 are identical with those of Embodiments 1 through 3. For convenience of explanation, the same reference numerals are given to constituent members having functions same as those illustrated in the drawings of Embodiments 1 through 3, and descriptions of such constituent members are omitted here.

FIG. 7 illustrates (i) a schematic shape of a picture element electrode 4 provided in an array substrate 1b of a liquid crystal display device, in accordance with Embodiment 4 and (ii) a pattern of protrusion sections 8 and 8a provided, as orientation separation means, on a counter electrode 7 of a counter substrate 5.

The auxiliary orientation separation means 4d is provided at the apex of the V-shaped recessed section 4b of the picture element electrode 4 (see FIG. 7). By providing the auxiliary orientation separation means 4d, scanning signal lines (GLn-1, GLn, and so forth) are partially exposed. In such a configuration, it is preferable to provide a shield electrode 21 (as is described in Embodiment 2) so as to cover each of partially exposed parts of the scanning signal lines (GLn-1, GLn, and so forth).

According to the configuration, it is possible to realize greater control over orientations of liquid crystal molecules in the vicinity of the apex of the V-shaped recessed section 4b of the picture element electrode 4, at which apex the auxiliary orientation separation means 4d is provided. It is therefore possible to control the liquid crystal molecules to be oriented more effectively.

This makes it possible to provide the liquid crystal display device which can effectively suppress a deterioration in display quality such as roughness of image.

Embodiment 5

Figure 8:
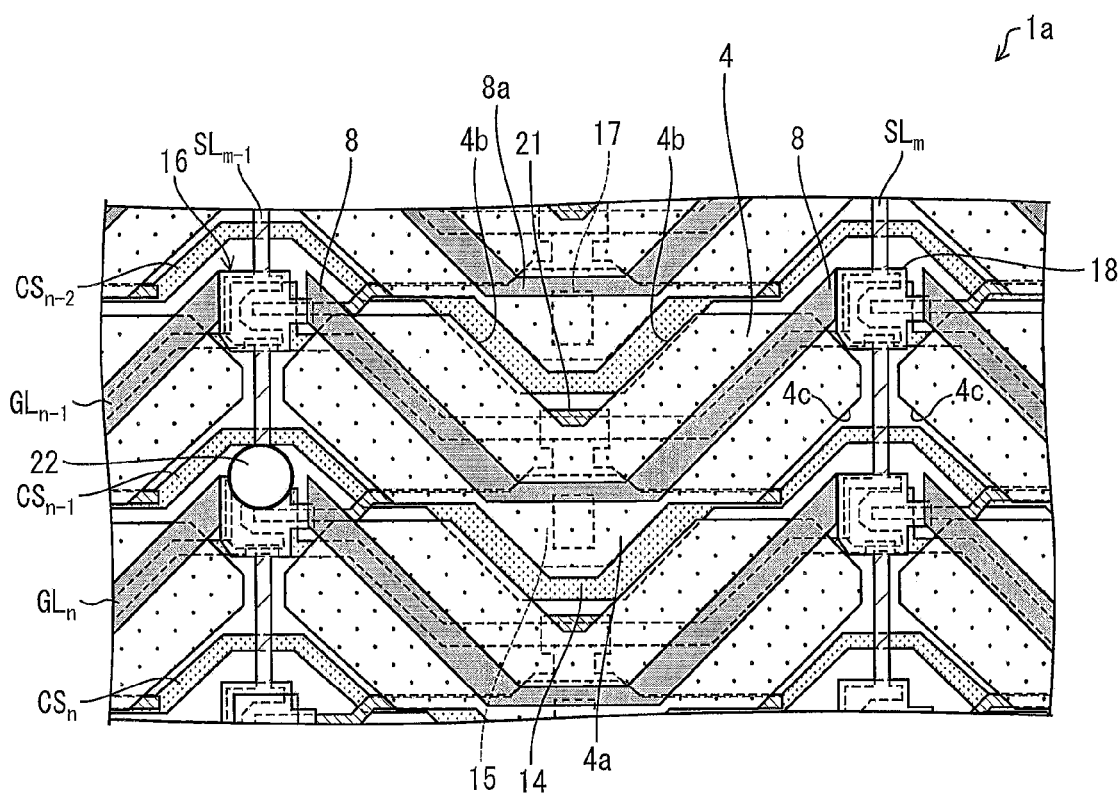
FIG. 8 illustrates (i) a schematic shape of a picture element electrode provided in an array substrate of a liquid crystal display device, in accordance with another embodiment of the present invention and (ii) a pattern of a photospacer provided on a counter electrode of a counter substrate.

The following description will discuss Embodiment 5 of the present invention, with reference to FIG. 8. Embodiment 5 is different from Embodiments 1 through 4 in that a photospacer 22 is provided between adjacent two picture elements, i.e., in a middle region between notch sections 4c of respective adjacent two picture element electrodes 4. Note that the photospacer 22 is provided on a side of a counter substrate 5 and serves to retain a constant cell thickness between an array substrate 1 and the counter substrate 5. The other configurations of Embodiment 5 are identical with those of Embodiments 1 through 4. For convenience of explanation, the same reference numerals are given to constituent members having functions same as those illustrated in the drawings of Embodiments 1 through 4, and descriptions of such constituent members are omitted here.

FIG. 8 illustrates (i) a schematic shape of a picture element electrode 4 provided in an array substrate 1a of a liquid crystal display device, in accordance with Embodiment 5 and (ii) a pattern of a photospacer 22 provided on a counter electrode 7 of a counter substrate 5.

In Embodiment 5, the photospacer 22, which is provided on the side of the counter substrate 5 and serves to retain the constant cell thickness between the array substrate 1 and the counter substrate 5, is provided between the adjacent two picture elements, i.e., in the middle region between the notch sections 4c of the respective adjacent two picture element electrodes 4 (see FIG. 8). Note, however, that Embodiment 5 is not limited to this, as long as the photospacer 22 is provided in the notch section(s) 4c of the picture element electrode(s) 4.

The number of the photospacer(s) 22 is not limited to a particular one, provided that a constant cell thickness can be retained between the array substrate 1 and the counter substrate 5. For example, a photospacer 22 can be provided in each region between adjacent two picture elements having a particular color(s).

In Embodiment 5, the photospacer 22 is made of a photosensitive resist having high transmittance of light in a visible region and is formed so as to have a predetermined shape. Note, however, that Embodiment 5 is not limited to this.

According to the configuration, the photospacer 22 can be disposed in a flat part of the array substrate 1a in which flat part no picture element electrode 4 is provided. This makes it possible to increase accuracy in retaining a cell thickness.

In general, an orientation disorder of liquid crystal molecules is likely to occur in the vicinity of a region where the photospacer 22 is provided. However, in Embodiment 5, since the photospacer 22 is provided in the notch sections 4c of the picture element electrodes 4, it is possible to suppress influence of the orientation disorder on an effective display region where liquid crystal molecules are oriented in predetermined directions.

This makes it possible to provide the liquid crystal display device which can effectively suppress a deterioration in display quality such as roughness of image.

Embodiment 6

Figure 9:
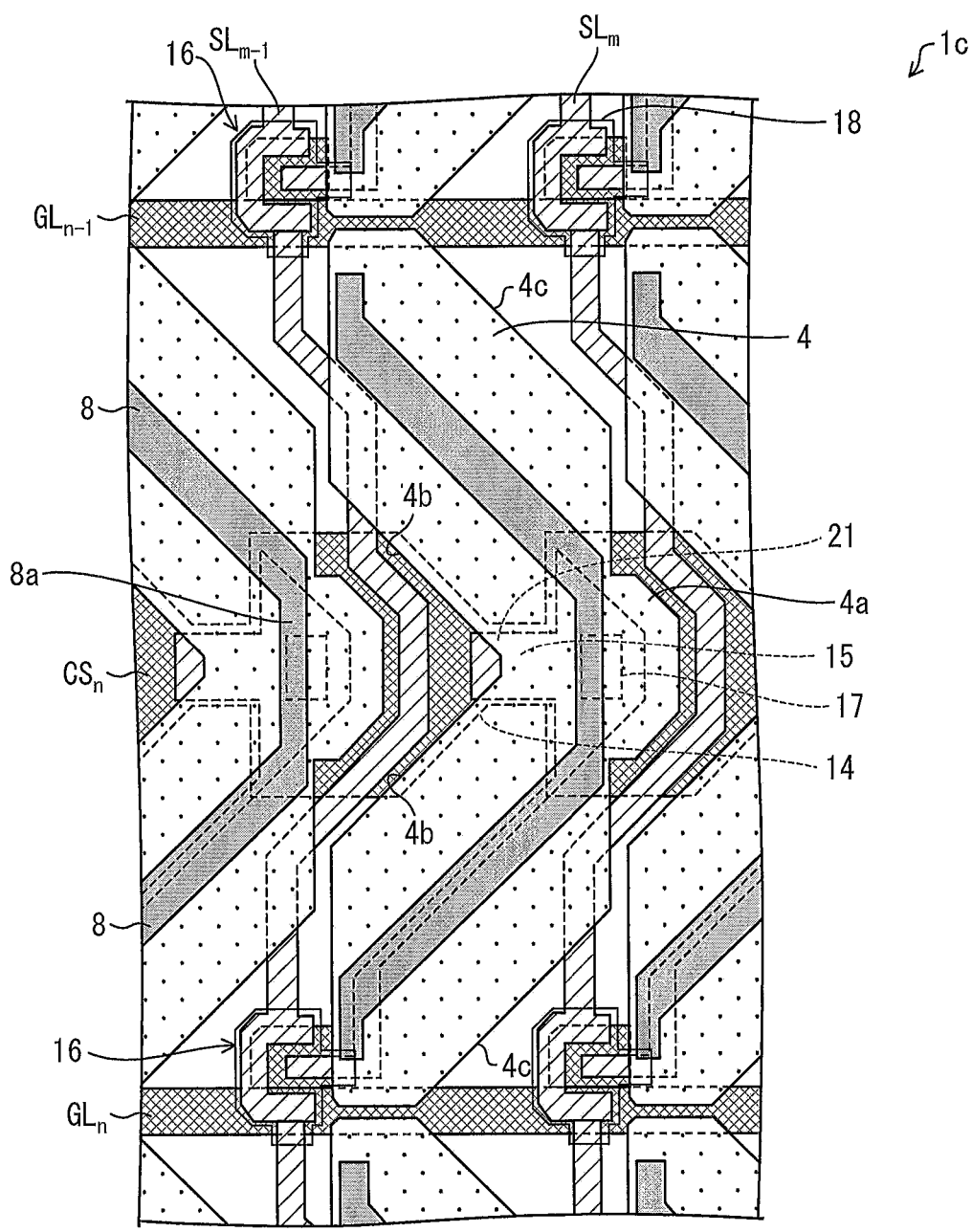
FIG. 9 illustrates (i) a schematic shape of a picture element electrode provided in an array substrate of a liquid crystal display device, in accordance with yet another embodiment of the present invention and (ii) a pattern of protrusion sections provided, as orientation separation means, on a counter electrode of a counter substrate.

The following description will discuss Embodiment 6 of the present invention, with reference to FIG. 9. Embodiment 6 is different from Embodiments 1 through 5 in that each of picture elements has a vertically long shape. The other configurations of Embodiment 6 are identical with those of Embodiments 1 through 5. For convenience of explanation, the same reference numerals are given to constituent members having functions same as those illustrated in the drawings of Embodiments 1 through 5, and descriptions of such constituent members are omitted here.

FIG. 9 illustrates (i) a schematic shape of a picture element electrode 4 provided in an array substrate 1c of a liquid crystal display device, in accordance with Embodiment 6 and (ii) a pattern of protrusion sections 8 and 8a provided, as orientation separation means, on a counter electrode 7 of a counter substrate 5.

Each of Embodiments 1 through 5 employs a configuration in which each of the picture elements has a horizontally long shape (i.e., a longer side of each of the picture elements extends laterally in the drawing). On the other hand, in the array substrate 1c provided in the liquid crystal display device of Embodiment 6, each of the picture elements has a vertically long shape (i.e., a longer side of each of the picture elements extends longitudinally in the drawing) (see FIG. 9).

Note that, in Embodiment 6, a shield electrode 21 (described in Embodiment 2) is formed with the use of a storage-capacitor counter electrode 15 (see FIG. 9).

In a case where each of the picture elements has the vertically long shape as above described, the shield electrode 21 can be easily formed by the use of a corresponding one of data signal lines SLm-1, SLm, and so forth or a storage-capacitor counter electrode 15. Except for this, the configuration of Embodiment 6 can bring about an effect similar to that of the configuration in which each of the picture elements has the horizontally long shape.

Embodiment 7

Figure 10:
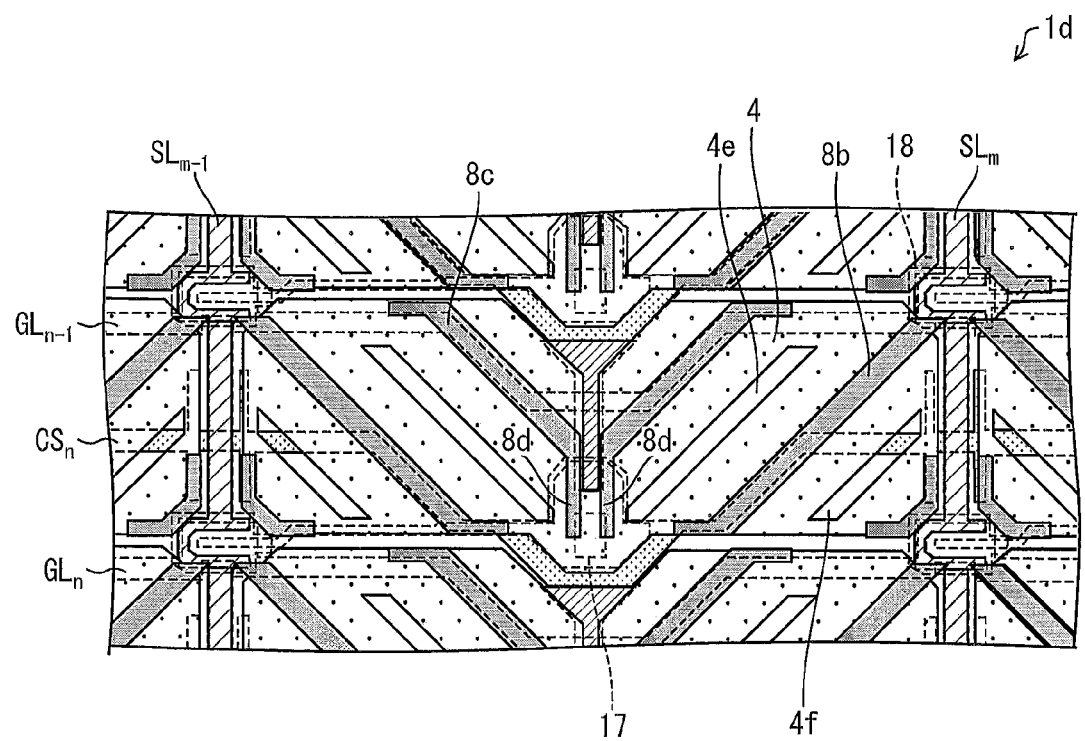
FIG. 10 illustrates (i) a schematic shape of a picture element electrode provided in an array substrate of a liquid crystal display device, in accordance with still another embodiment of the present invention and (ii) a pattern of protrusion sections provided, as orientation separation means, on a counter electrode of a counter substrate.

The following description will discuss Embodiment 7 of the present invention, with reference to FIG. 10. Embodiment 7 is different from Embodiments 1 through 6 in that (i) the number of protrusion sections (8b, 8c, and 8d) provided, as orientation separation means, on a counter electrode 7 of a counter substrate 5 is increased and (ii) slits 4e and 4f are provided, as orientation separation means, in a picture element electrode 4 of an array substrate 1d. The other configurations of Embodiment 7 are identical with those of Embodiments 1 through 6. For convenience of explanation, the same reference numerals are given to constituent members having functions same as those illustrated in the drawings of Embodiments 1 through 6, and descriptions of such constituent members are omitted here.

FIG. 10 illustrates (i) a schematic shape of a picture element electrode 4 provided in an array substrate 1d of a liquid crystal display device, in accordance with Embodiment 7 and (ii) a pattern of protrusion sections provided, as orientation separation means, on a counter electrode 7 of a counter substrate 5.

The protrusion sections 8b, 8c, and 8d are provided, as orientation separation means, on the counter electrode 7 of the counter substrate 5 (see FIG. 10). Meanwhile, the picture element electrode 4 has the slits 4e and 4f extending in any of directions identical with those in which the protrusion sections 8b, 8c, and 8d extend (see FIG. 10).

Even in a case where the number of orientation separation means is increased in one (1) picture element as above described, it is possible to provide a high quality liquid crystal display device which can effectively suppress a deterioration in display quality such as roughness of image, by providing a projecting section 4a of the picture element electrode 4 so as (i) to match a contact hole 17 when viewed from the top of the liquid crystal display panel and (ii) to be adjacent to a recessed section 4b, serving as orientation separation means, of an adjacent picture element electrode 4.

In a case where the protrusion sections 8d (second protrusion) are further provided, as orientation separation means, on the counter electrode 7 of the counter substrate 5 so as to be located in a peripheral region of the contact hole 17 (i.e., in an end part of the contact hole 17) (see FIG. 10), it is possible to further effectively suppress an orientation disorder of liquid crystal molecules in the peripheral region of the contact hole 17.

Embodiment 8

Figure 11:
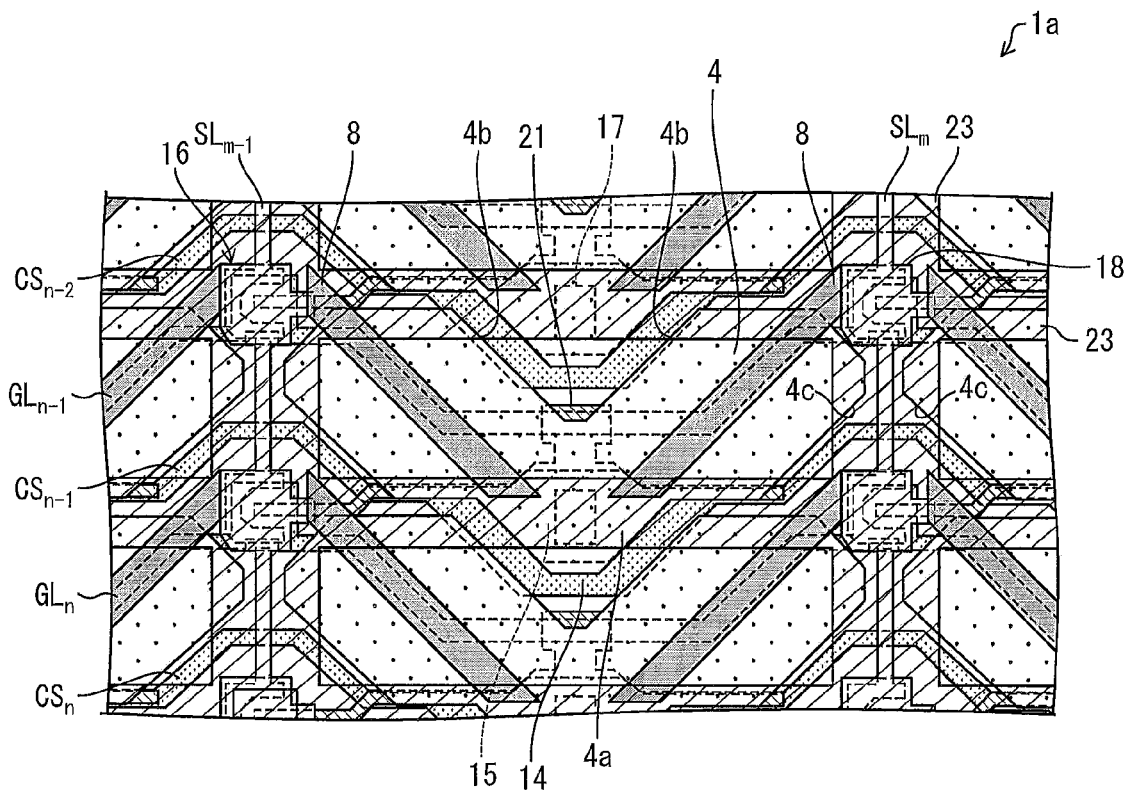
FIG. 11 illustrates (i) a schematic shape of a picture element electrode provided in an array substrate of a liquid crystal display device, in accordance with another embodiment of the present invention and (ii) a pattern of a black matrix provided on a counter substrate.
Figure 12:
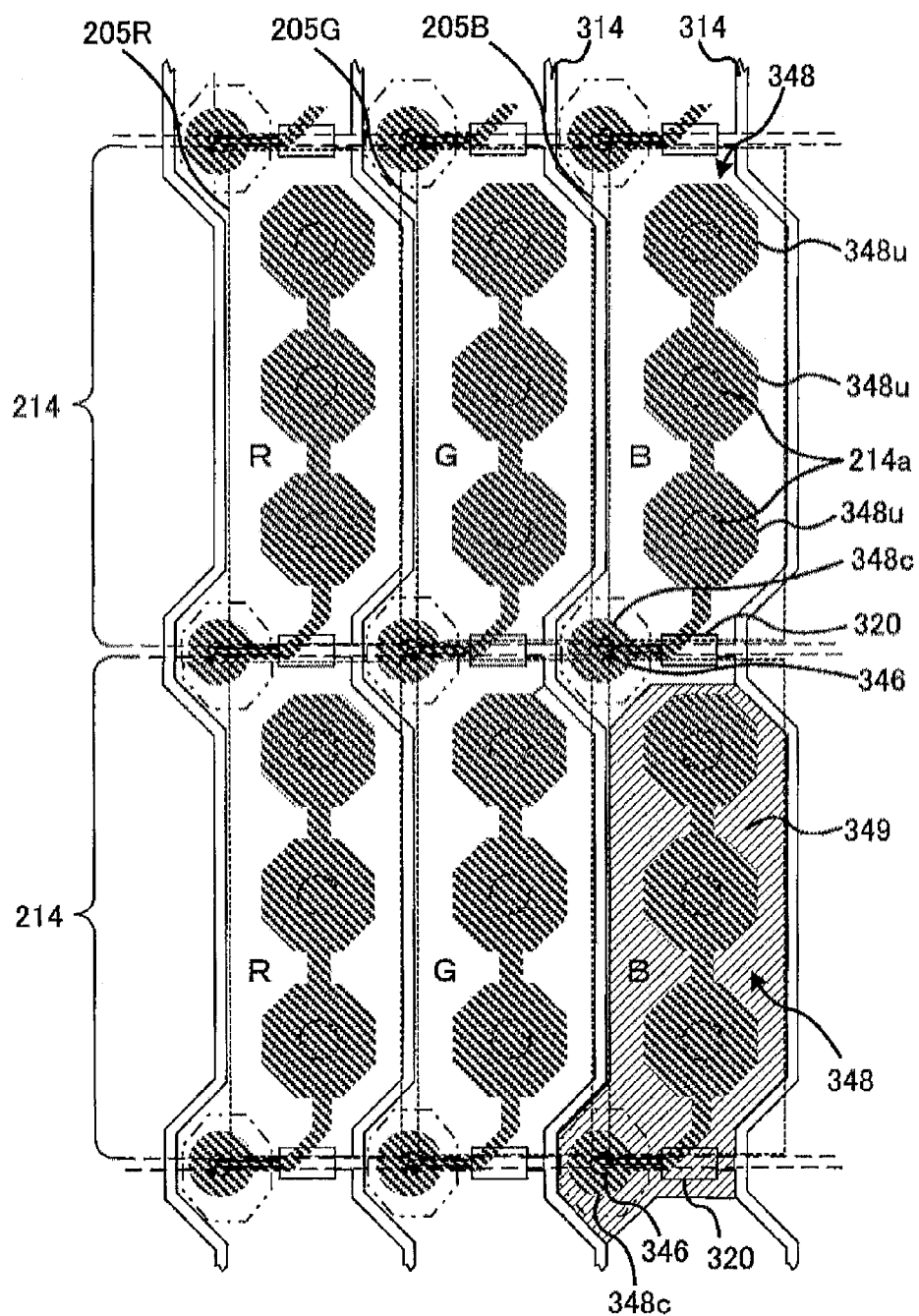
FIG. 12 illustrates a schematic configuration of a picture element electrode included in a conventional vertical alignment type liquid crystal display device.

The following description will discuss Embodiment 8 of the present invention, with reference to FIG. 11. Embodiment 8 is different from Embodiments 1 through 7 in that a black matrix 23, serving as a light-shielding member, is at least partially provided in a part of a counter substrate 5 which part matches a projecting section 4a of a picture element electrode 4, when viewed from a top of the liquid crystal display panel. The other configurations of Embodiment 8 are identical with those of Embodiments 1 through 7. For convenience of explanation, the same reference numerals are given to constituent members having functions same as those illustrated in the drawings of Embodiments 1 through 7, and descriptions of such constituent members are omitted here.

FIG. 11 illustrates (i) a schematic shape of a picture element electrode 4 provided in an array substrate 1a of a liquid crystal display device, in accordance with Embodiment 8 and (ii) a pattern of a black matrix 23 provided on a counter substrate 5.

It is preferable that the black matrix 23 is at least partially provided on in a part of the counter substrate 5 which part matches the projecting section 4a of the picture element electrode 4, when viewed from the top of the liquid crystal display panel.

In Embodiment 8, the black matrix 23 is provided, so as to surround each picture element, in a region of the counter substrate 5 which region matches, when viewed from the top of the liquid crystal display panel, (i) the projecting section 4a of the picture element electrode 4, (ii) a region where the TFT elements 16 are formed, (iii) a region where storage capacitor lines CSn-2, CSn-1, CSn, and so forth are formed, and (iv) a region where data signal lines SLm-1, SLm, and so forth are formed. This makes it possible to (i) effectively prevent an orientation disorder of liquid crystal molecules, leakage of light, and leakage of reflection light in a region where the contact hole 17 is formed and (ii) reduce the mixture of different colors of adjacent picture elements. Note, however, that Embodiment 8 is not limited to this.

In Embodiment 8, a photosensitive resin containing carbon black is employed as the black matrix 23. Note, however, that Embodiment 8 is not limited to this.

In the liquid crystal display panel of the present invention, it is preferable that each of the picture element electrodes has a recessed section which is a partial cut of the picture element electrode, so that the recessed section accommodates at least part of a projecting section of an adjacent picture element electrode.

According to the configuration, the recessed section of the picture element electrode is shaped so that a projecting section of a picture element, which is immediately adjacent to the recessed section, can be disposed in the recessed section.

With the configuration, it is possible to efficiently utilize the recessed section of the picture element electrode, which could not be used as an effective display region. This makes it possible to provide the liquid crystal display panel having a high aperture ratio and high transmittance.

In the liquid crystal display panel of the present invention, it is preferable that at least part of the recessed section of the picture element electrode is substantially parallel to the protrusion and/or the notch of the common electrode, when viewed from the top of the liquid crystal display panel.

According to the configuration, the recessed section of the picture element electrode is shaped so that a projecting section of a picture element, which is immediately adjacent to the recessed section, can be disposed in the recessed section. Further, at least part of the recessed section functions as orientation separation means.

With the configuration, it is possible to (i) efficiently utilize the recessed section of the picture element electrode, which could not be used as an effective display region and (ii) suppress influence of an orientation disorder resulting from a through hole. This makes it possible to provide the liquid crystal display panel having a high aperture ratio and high transmittance.

In the liquid crystal display panel of the present invention, it is preferable that wires provided on the side of the other substrate which side contacts the liquid crystal layer are located closer to the other substrate than shield electrodes, and at least part of the recessed section where the wire is partially exposed matches the shield electrode, when viewed from the top of the liquid crystal display panel.

In a case where the shield electrode is not provided in a part in which a wire for controlling the active element is partially exposed, (i) orientation disorder of liquid crystal occur due to influence of electrical potential change in the wire and (ii) impurity ions are trapped in the partially exposed part. Further, the part, in which the impurity ions are trapped, becomes a singularity which causes a defective orientation of liquid crystal. This results in a defective display of the liquid crystal display panel.

In a case where the shield electrode is provided as in the present invention, it is possible to shield an electric field of the wire. This makes it possible to suppress the defective display of the liquid crystal display panel.

In the liquid crystal display panel of the present invention, it is preferable that the recessed section of the picture element electrode has a second notch section which is a partial cut of the recessed section and functions as orientation separation means.

According to the configuration, it is possible to realize greater control over orientations of liquid crystal molecules in the recessed section of the picture element electrode, which recessed section has the second notch section. It is therefore possible to control the liquid crystal molecules to be oriented more effectively.

This makes it possible to provide the liquid crystal display panel which can effectively suppress a deterioration in display quality such as roughness of image.

In the liquid crystal display panel of the present invention, it is preferable that, when viewed from the top of the liquid crystal display panel, at least part of the projecting section of the picture element electrode matches a region where a storage capacitor is formed, the storage capacitor being constituted by a storage-capacitor counter electrode connected to the drain electrode of the active element, an insulating layer, and a storage capacitor electrode connected to a storage capacitor line.

According to the configuration, the projecting section of the picture element electrode is formed such that, when viewed from the top of the liquid crystal display panel, at least part of the projecting section matches the region where the storage capacitor is formed, in which region a metal layer or the like is provided to block the entrance of light. This makes it possible to provide the liquid crystal display panel which has a high aperture ratio and high transmittance.

In the liquid crystal display panel of the present invention, it is preferable that the partially exposed wire is the scanning signal line, and the shield electrodes are provided in a layer where the picture element electrodes are formed or in a layer where the data signal lines are formed.

In a case where the shield electrode is not provided in a spot where the scanning signal line is exposed, impurity ions are trapped in the spot during a period in which a Low level electric potential is being applied to the scanning signal line, and the spot in which the impurity ions are trapped becomes a singularity which causes a defective orientation of liquid crystal. Accordingly, a defective display is caused in the liquid crystal display panel.

According to the configuration of the present invention, it is possible to easily provide the shield electrode and to suppress the defective display in the liquid crystal display panel.

In the liquid crystal display panel of the present invention, it is preferable that, on the side of the one substrate which side contacts the liquid crystal layer, second protrusions are each provided so as to match at least part of an end part of the through hole, when viewed from the top of the liquid crystal display panel.

According to the configuration, it is possible to suppress an orientation disorder of liquid crystal molecules around the through hole, and it is possible to suppress uneven orientation disorder caused by manufacturing variations. This makes it possible to provide the liquid crystal display panel which can effectively suppress a deterioration in display quality such as roughness of image.

In the liquid crystal display panel of the present invention, it is preferable that a photospacer for retaining a thickness of the liquid crystal layer is provided at the notch section of the picture element electrode.

According to the configuration, the photospacer can be disposed in a flat part in which no picture element electrode is provided. This makes it possible to increase accuracy in retaining the thickness of the liquid crystal layer.

In general, an orientation disorder of liquid crystal molecules is easily caused in the vicinity of the photospacer. However, in the present invention, the photospacer is provided at the notch section of the picture element electrode. This makes it possible to suppress influence of an orientation disorder on an effective display region where liquid crystal molecules are oriented in predetermined directions.

It is therefore possible to provide the liquid crystal display panel which can effectively suppress a deterioration in display quality such as roughness of image.

In the liquid crystal display panel of the present invention, it is preferable that, when viewed from the top of the liquid crystal display panel, a light-shielding layer is provided on the side of the one substrate which side contacts the liquid crystal layer in at least part of a region where the projecting section of the picture element electrode matches the through hole.

According to the configuration, when viewed from the top of the liquid crystal display panel, the light-shielding layer is provided on the side of the one substrate which side contacts the liquid crystal layer in at least part of the region where the projecting section of the picture element electrode matches the through hole. This makes it possible to further effectively prevent an orientation disorder, leakage of light, and leakage of reflection light in the region where the through hole is formed.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention is effective in improving display quality of an MVA type liquid crystal display device and in reduction of mounting cost. The present invention is particularly useful for a liquid crystal display device which is provided in a middle-sized mobile product such as an in-vehicle equipment, a photo frame, IA (Industrial Appliance), or PC (Personal Computer).

REFERENCE SIGNS LIST 1, 1a, 1b, 1c, 1d Array substrate
2 Glass substrate (first insulating substrate)
3 Interlayer insulating film (insulating layer)
4 Picture element electrode
4a Projecting section
4b Recessed section
4c Notch section
4d Auxiliary orientation separation means (second notch section)
5 Counter substrate
6 Glass substrate (second insulating substrate)
7 Counter electrode (common electrode)
8 Protrusion section (protrusion)
8a, 8d Protrusion section (second protrusion)
9 Liquid crystal layer
12 Liquid crystal display panel
13 Liquid crystal display device
14 Storage capacitor electrode
15 Storage-capacitor counter electrode
16 TFT element (active element)
17 Contact hole (through hole)
18 Semiconductor layer
21 Shield electrode
22 Photospacer
23 Black matrix (light-shielding layer)
SLm Data signal line
GLn Scanning signal line
PIX Picture element
CS Storage capacitor
R1 Display region

The invention claimed is:

1. A liquid crystal display panel comprising:
a first insulating substrate;
a second insulating substrate;
a liquid crystal layer, interposed between the first insulating substrate and the second insulating substrate, exhibiting a negative dielectric anisotropy;
a plurality of picture elements,
the liquid crystal display panel being arranged such that:
one substrate of the first and second insulating substrates has, on its side contacting the liquid crystal layer, a common electrode with protrusions and/or notches that function as orientation separation means;
the other substrate has scanning signal lines, data signal lines, and picture element electrodes provided on a side thereof contacting the liquid crystal layer;
each of the picture element electrodes has a notch section and a projecting section;
the picture element electrodes are electrically connected to respective drain electrodes of active elements, which are provided to control the picture element electrodes, via corresponding through holes provided in an insulating layer;
the picture element electrodes of the other substrate are located closer to the liquid crystal layer than the insulating layer; and
at least part of the projecting section of the picture element electrode matches the through hole when viewed from a top of the liquid crystal display panel,
so that the picture elements are identical to one another in orientation pattern of liquid crystal molecules oriented in different directions in the liquid crystal layer.

2. The liquid crystal display panel according to claim 1, wherein
each of the picture element electrodes has a recessed section which is a partial cut of the picture element electrode, so that the recessed section accommodates at least part of a projecting section of an adjacent picture element electrode.

3. The liquid crystal display panel according to claim 2, wherein
at least part of the recessed section of the picture element electrode is substantially parallel to the protrusion and/or the notch of the common electrode, when viewed from the top of the liquid crystal display panel.

4. The liquid crystal display panel according to claim, 2, wherein
wires provided on the side of the other substrate which side contacts the liquid crystal layer are located closer to the other substrate than shield electrodes, and
at least part of the recessed section where the wire is partially exposed matches the shield electrode, when viewed from the top of the liquid crystal display panel.

5. The liquid crystal display panel according to claim 2, wherein
the recessed section of the picture element electrode has a second notch section which is a partial cut of the recessed section and functions as orientation separation means.

6. The liquid crystal display panel according to any claim 1, wherein
when viewed from the top of the liquid crystal display panel, at least part of the projecting section of the picture element electrode matches a region where a storage capacitor is formed, the storage capacitor being constituted by a storage-capacitor counter electrode connected to the drain electrode of the active element, an insulating layer, and a storage capacitor electrode connected to a storage capacitor line.

7. The liquid crystal display panel according to claim 4, wherein
the partially exposed wire is the scanning signal line, and the shield electrodes are provided in a layer where the picture element electrodes are formed or in a layer where the data signal lines are formed.

8. The liquid crystal display panel according to claim 1, wherein
on the side of the one substrate which side contacts the liquid crystal layer, second protrusions are each provided so as to match at least part of an end part of the through hole, when viewed from the top of the liquid crystal display panel.

9. The liquid crystal display panel according to claim 1, wherein a photospacer for retaining a thickness of the liquid crystal layer is provided at the notch section of the picture element electrode.

10. The liquid crystal display panel according to any claim 1, wherein when viewed from the top of the liquid crystal display panel, a light-shielding layer is provided on the side of the one substrate which side contacts the liquid crystal layer in at least part of a region where the projecting section of the picture element electrode matches the through hole.

11. A liquid crystal display device comprising:
a liquid crystal display panel according to claim 1.

* * * * *